United States Patent [19]

Goiricelaya

[11] Patent Number: 5,375,071
[45] Date of Patent: Dec. 20, 1994

[54] MEANS FOR GENERATING THE GEOMETRY OF A MODEL IN TWO DIMENSIONS THROUGH THE USE OF ARTIFICIAL VISION

[75] Inventor: Inaki Goiricelaya, Durango, Spain

[73] Assignee: Ona Electro-Erosion, S.A., Spain

[21] Appl. No.: 981,294

[22] Filed: Nov. 25, 1992

[51] Int. Cl.⁵ .................................................. G06R 9/48
[52] U.S. Cl. ............................................ 364/560; 364/191
[58] Field of Search ............ 364/578, 559, 560, 552, 364/191; 382/22, 49, 16, 20, 21, 8; 358/111

[56] References Cited

U.S. PATENT DOCUMENTS

| | | | |
|---|---|---|---|
| 4,445,137 | 4/1984 | Panofsky | 358/107 |
| 4,561,061 | 12/1985 | Sakamoto et al. | 364/550 |
| 4,570,180 | 2/1986 | Baier et al. | 358/106 |
| 4,703,512 | 10/1987 | Saka et al. | 382/22 |
| 4,783,833 | 11/1988 | Kawabata et al. | 382/22 |
| 4,805,127 | 2/1989 | Hata et al. | 364/521 |
| 4,845,764 | 7/1989 | Ueda et al. | 382/8 |
| 4,896,279 | 1/1990 | Yoshida | 364/559 |
| 5,041,961 | 8/1991 | Goiricelaya | 364/191 |
| 5,268,968 | 12/1993 | Yoshida | 364/564 |

OTHER PUBLICATIONS

Ballard et al; "Computer Vision"; Prentice Hall (1982).
P. Brulard et al., "Automatic system for dimension recording and high accuracy metrology of plane pieces without contact", Optics and Laser Technology, Aug. 1986, pp. 198–202.

*Primary Examiner*—Ellis B. Ramirez
*Attorney, Agent, or Firm*—Lucas & Just

[57] ABSTRACT

A device for generating the geometry of a model in two dimensions through the use of artificial vision comprising a linear camera (4) located at a given height above a motor-driven table (2,5) which includes a working window in such a way that the first stage acquires, digitally encodes and stores a two-dimensional image of the piece and the last stage provides for the modelling program to be based on an iterative search algorithm for straight units and arcs of circles along the perimeter of the two dimensional image of the part.

3 Claims, 2 Drawing Sheets

MEANS FOR GENERATING THE GEOMETRY OF A MODEL IN TWO DIMENSIONS THROUGH THE USE OF ARTIFICIAL VISION

The applicant is the holder of Spanish Patent No. 8802189 (see U.S. Pat. No. 5,041,961) which specifies that the fundamentals of the system for generating the geometry of a model in two dimensions through the use of artificial vision is based on the following four stages:

1. Acquisition, digital encoding and storage of two-dimensional images.
2. Extraction and storage of the perimeters of the geometries present in the image.
3. Modelling of the perimeter by approximating the latter to straight and circular units.
4. Conversion of the model obtained into DXF format (conventional format).

In order to increase the accuracy of the system the applicant plans to use linear cameras instead of the matrix cameras which were used previously, as these give better spatial resolution. As a consequence item 1 relating to image acquisition is substantially amended.

It has also been discovered how the automatic modelling algorithm should be modified (item 3).

Items 2 and 4 are unchanged from the description in Spanish Patent No. 8802189 (U.S. Pat. No. 5,041,961).

For a better understanding of the object of this invention a preferred embodiment thereof, to which additional changes may be made without detracting from its fundamental nature, is illustrated in the drawings.

Stages 1 and 3, which have been changed in relation to the system in Spanish Patent No. 8802189, are described below.

1. Acquisition, digital encoding and storage of two dimensional images.

For image acquisition the system comprises a linear camera (4) located at a given height above a moving table (2), which moves e.g. in one direction, and encloses a window or working area provided with a backlighting system on which the piece (m) which is to be scanned is located.

Table (2) starts from an initial position in which the vertical to the camera coincides with the start of the working window. Movement of table (2) is brought about by means of a motor (5), e.g. a stepping motor or closed loop DC motor, which is controlled by a processor (1) by means of a motor board (6).

The procedure which has to be followed in order to obtain a digital two-dimensional image is as follows:

The camera (4) obtains an image line and encodes it digitally.

The line obtained is digitally encoded into binary for comparison with a previously defined digital threshold.

The transitions in the binary image are calculated and stored.

Table (2) is moved and the process of line acquisition, digital encoding, calculation and storage of transitions, and movement of the table, is repeated until the entire working area has been covered.

This process yields a two-dimensional binary image of the part (m) being modeled, coded in the form of transitions associated with each line.

The following parameters have been fixed in advance:

Camera exposure time for acquisition of the line.
Digital encoding threshold.
Speed of movement of the table, which is adjusted so that the aspect relationship or the horizontal/vertical relationship of the unit image is approximately 1, i.e. the image unit is square.

Figure 1:
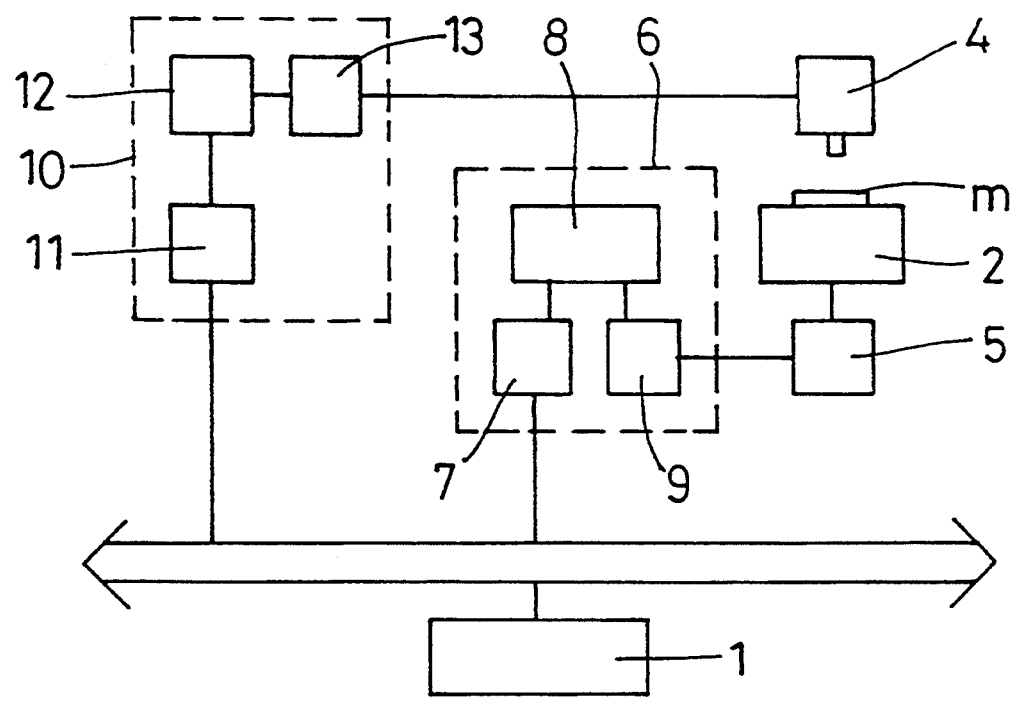
FIG. 1 is a block diagram of the entire system incorporating the components identified in the main patent as a processing unit (1).
Figure 2:
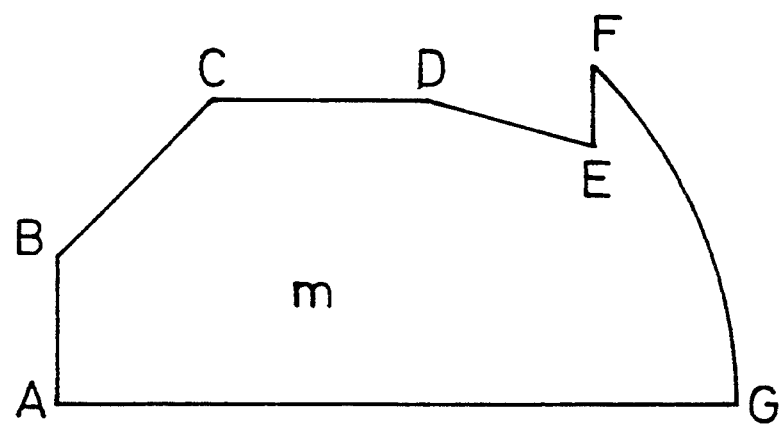
FIG. 2 is a diagrammatical representation of a model which is to be scanned by the system.

A camera board (10) is provided for control of the camera (4) and this comprises (FIG. 1):

a bus (b) interface (11),
a RS-422 adaptor (13),
a control module (12) which controls the exposure time, frequency and method of operation of camera (4).

A motor board (6) is provided for control of motor (5) and this comprises:

a bus (b) interface (7),
a power pulse generator (9),
a control module (8) which controls generator (9) and the rate and direction of movement.

3. Modelling the perimeter by approximating the latter to straight and circular segments.

The method is based on an iterative algorithm which searches for straight and circular segments around the perimeter.

There is an intermediate stage between the perimeter and its modelling which consists of extracting the basic shapes of which it is formed in accordance with a chain code which lines up points having the same code value. In this way the basic units consist of consecutive points in the same direction.

The line and arcs search algorithm acts on chains of basic units, obtaining the geometry of the part from these.

Let C (po,pn) be a chain of basic units which starts at point (po) and ends at point (pn).

The algorithm operates as described below:

The radius ($r_1$) and the centre ($O_1$) of the circumference passing through (po, pn) and the mid-point (pn/2) is calculated.

If the radius ($r_1$) obtained is greater than a predetermined value (S), $r_1 > S$ a check has to be made to see whether or not the chain (C) (po, pn) forms a straight line. In order to do this:

The point (M) which is furthest from the straight line formed by the points (po and pn), which lies at a distance (a), is searched for in chain (C) (po, pn), If this distance (a) is less than a certain predetermined value $V_1$, $a < V_1$, it decides that (C) (po, pn) is a straight line, If on the contrary $a > V_1$, it runs the algorithm again subdividing chain (C) (po, pn) into two chains c(po.M) and C(M.pn) and repeats the procedure.

If the radius ($r_1$) obtained is less than the predetermined value (S), $r < S$, it has to check whether or not (C) (po, pn) is an arc of a circle. The steps are as follows:

The distances (di) from points (P) to the centre of the circumference ($O_1$) are calculated, The point (M) of maximum error (dm - $r_1$) with respect to the theroretical radius ($r_1$) of the circle segment formed by (po,pn) and the mid-point (pn/2) is searched for in chain (C) (po, pn), If this error (dm -$r_1$) is less than a predetermined threshold $V_2$, (dm - $r_1$) < $V_2$, it decides that C (po, pn) forms an arc of a circle.

If this is not the case it again runs the algorithm on chains C(po,M) and C(M,pn).

In this way we approximate the complete perimeter to a series of straight and circular units.

Figure 3:
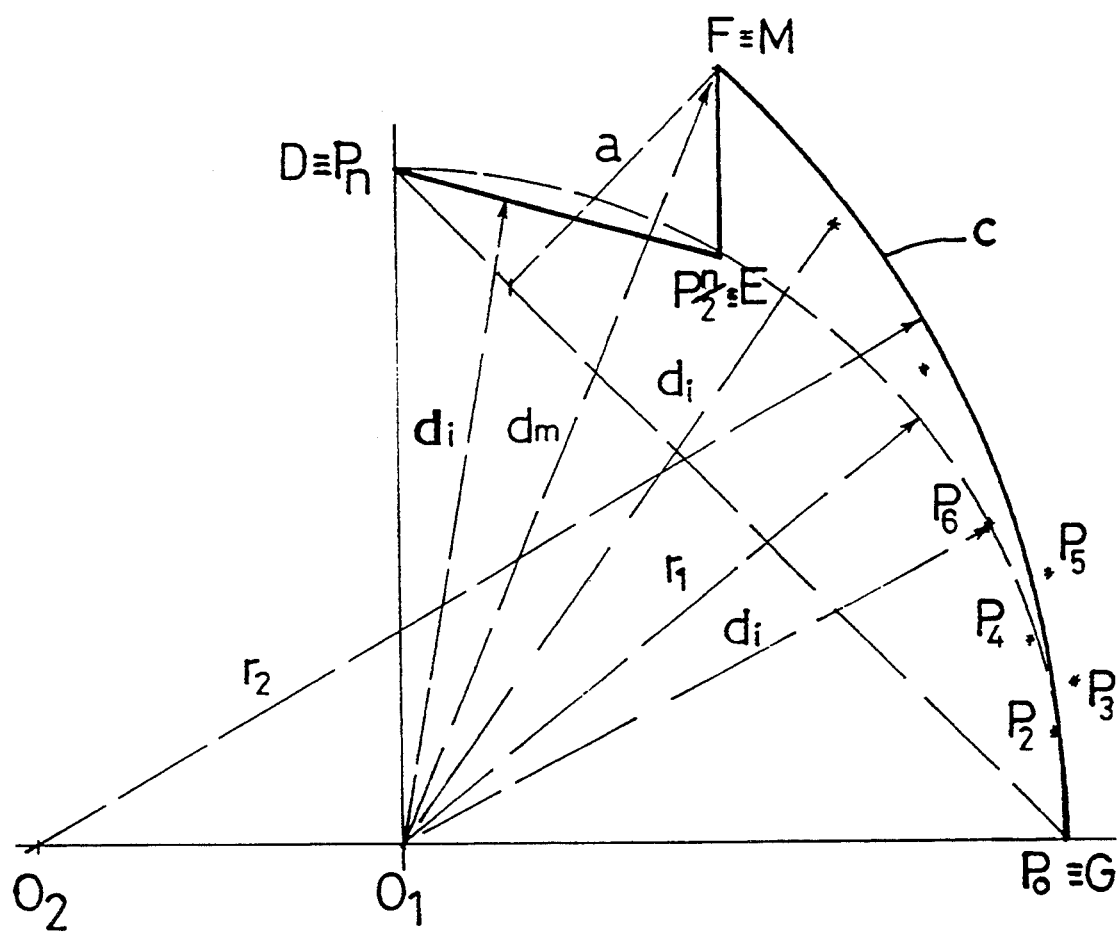
FIG. 3 is a diagram of the manner in which the system operates on the model in FIG. 2.

In the case in FIG. 3, and using the algorithm described, it is found that there is a straight unit from point (pn) to point pn/2→DE, another straight unit from mid-point pn/2 to further point M→EF and an arc of a circle of radius ($r_2$) and centre ($O_2$) along the unit from M to Po→FG.

In this way the perimeter is reduced to:

1. Straight lengths defined by their starting and ending points,
2. Arcs of circles defined by their centre (O), their radius (r) and the starting and ending points of the arcs, determined preferably by their polar coordinates, so that the perimeter is perfectly defined, i.e. modeled.

I claim:

1. A system for generating the geometry of a model in two dimensions through the use of artificial vision, characterised in that it comprises a linear camera mounted above a table which is caused to move by a motor and which includes a working area, comprising:
   a) a first stage in which:
      $a_1$) the linear camera acquires an image line and digitally encodes it,
      $a_2$) the line acquired is converted into binary for comparison with a previously determined binary threshold,
      $a_3$) the transitions in the binary image are calculated and stored,
      $a_4$) the table is moved and the previous steps are repeated until the working area is covered,
   b) a second stage in which the parameters of the geometries present in the image are extracted and stored,
   c) a third stage in which the basic units making up the perimeter are extracted in accordance with a chain code which lines up points having the same code value, defines a starting point, an end point and a mid-point for the chain and applies an algorithm defined by the steps below to the chains of basic units:
      $c_1$) the radius ($r_1$) and the centre of the circle passing through the start point, the end point and the mid-point are calculated,
      $c_2$) if the value for the radius ($r_1$) is greater than a predetermined value (S)
         $c_{21}$) the point in the chain furthest from the straight line joining its start point and end point is searched for,
            $c_{211}$) if the said distance is less than a certain predetermined value the chain is taken to be a straight line,
            $c_{212}$) if the said distance is greater than a certain predetermined value the initial chain is subdivided into two chains whose end points are the original starting point and the furthest point and the end point and the furthest point respectively, and the algorithm is applied again,
      $c_3$) if the value for the radius ($r_1$) is less than the predetermined value (S)
         $c_{31}$) then a search is made for the point in the chain whose distance (a) from the circle mentioned is a maximum, the point of maximum error,
            $c_{311}$) if the said distance (a) is less than a predetermined value ($V_1$) the chain is taken to form the arc of a circle,
            $c_{312}$) if the said distance (a) is greater than the predetermined value ($V_1$) the chain is divided into two chains whose end points are the starting point and the point of maximum error and the end point and the point of maximum error respectively, the perimeter being reduced to straight units defined by the coordinates of their starting and end points and arcs of circles defined by their centres, radii and the coordinates of their start and end points.

2. A system for generating the geometry of a model in two dimensions through the use of artificial vision according to claim 1, characterised in that the linear camera is controlled by a camera board comprising an interface bus, a camera adapter and a control module which controls the exposure time, frequency and manner of operation of the camera.

3. A system for generating the geometry of a model in two dimensions through the use of artificial vision according to claim 2, characterised in that the motor is controlled by a motor board comprising a bus interface, a power pulse generator and a module controlling the speed and direction of movement, and the generator.

* * * * *